United States Patent
Slifka (10) Patent No.: US 9,916,826 B1
(45) Date of Patent: *Mar. 13, 2018

(54) TARGETED DETECTION OF REGIONS IN SPEECH PROCESSING DATA STREAMS

(71) Applicant: Amazon Technologies, Inc., Seattle, WA (US)

(72) Inventor: Janet Louise Slifka, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/978,689

(22) Filed: Dec. 22, 2015

Related U.S. Application Data (63) Continuation of application No. 13/693,645, filed on Dec. 4, 2012, now Pat. No. 9,224,387.

(51) Int. Cl.
- *G10L 15/00* (2013.01)
- *G10L 15/06* (2013.01)
- *G10L 15/08* (2006.01)

(52) U.S. Cl.
CPC .......... *G10L 15/063* (2013.01); *G10L 15/08* (2013.01); *G10L 2015/088* (2013.01)

(58) Field of Classification Search
CPC ..... G10L 15/22; G10L 15/265; G10L 15/065; G10L 15/063
See application file for complete search history.

(56) References Cited

U.S. PATENT DOCUMENTS

| | | | | |
|---|---|---|---|---|
| 5,864,805 A * | 1/1999 | Chen | ...... | G10L 15/22 704/235 |
| 6,088,671 A * | 7/2000 | Gould | ...... | G10L 15/26 704/235 |
| 7,720,683 B1 * | 5/2010 | Vermeulen | ...... | G10L 15/22 704/235 |
| 2002/0099542 A1 * | 7/2002 | Mitchell | ...... | G06F 17/2241 704/231 |
| 2004/0138881 A1 * | 7/2004 | Divay | ...... | G06F 17/2725 704/231 |
| 2007/0106494 A1 * | 5/2007 | Detlef | ...... | G06F 17/273 704/9 |
| 2009/0276215 A1 * | 11/2009 | Hager | ...... | G06F 17/273 704/235 |
| 2010/0161332 A1 * | 6/2010 | Seltzer | ...... | G10L 15/063 704/244 |
| 2011/0022387 A1 * | 1/2011 | Hager | ...... | G06Q 10/107 704/235 |
| 2012/0004910 A1 * | 1/2012 | Quidilig | ...... | H04L 12/5835 704/235 |
| 2012/0310643 A1 * | 12/2012 | Labsky | ...... | G10L 13/08 704/235 |
| 2013/0197909 A1 * | 8/2013 | Hager | ...... | G06F 17/273 704/235 |

* cited by examiner

Primary Examiner — Douglas Godbold
(74) Attorney, Agent, or Firm — Pierce Atwood LLP (57) ABSTRACT

In speech processing systems, a special audio trigger indication is configured to efficiently isolate and mark incorrect speech processing results. The trigger indication may be configured to be easily recognizable by a speech processing device under various ASR and acoustic conditions. Once a speech processing device recognizes the trigger indication, incorrectly processed speech processing results are marked and may be isolated and prioritized for review by training and upgrading processes.

21 Claims, 8 Drawing Sheets

TARGETED DETECTION OF REGIONS IN SPEECH PROCESSING DATA STREAMS

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with natural language processing techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Speech processing systems may improve the quality of their results by isolating certain examples of speech processing input and output, analyzing how the outputs were created from the inputs, and determining how the system may be adjusted to provide better, more efficient results. This "training" process may be improved by focusing efforts on correcting processing errors which led to incorrect speech processing results rather than on studying results which were originally processed correctly. To identify such desirable incorrect speech processing results in a more efficient manner, a method is offered to target these desired speech regions within a large stream of speech processing data.

Figure 1:
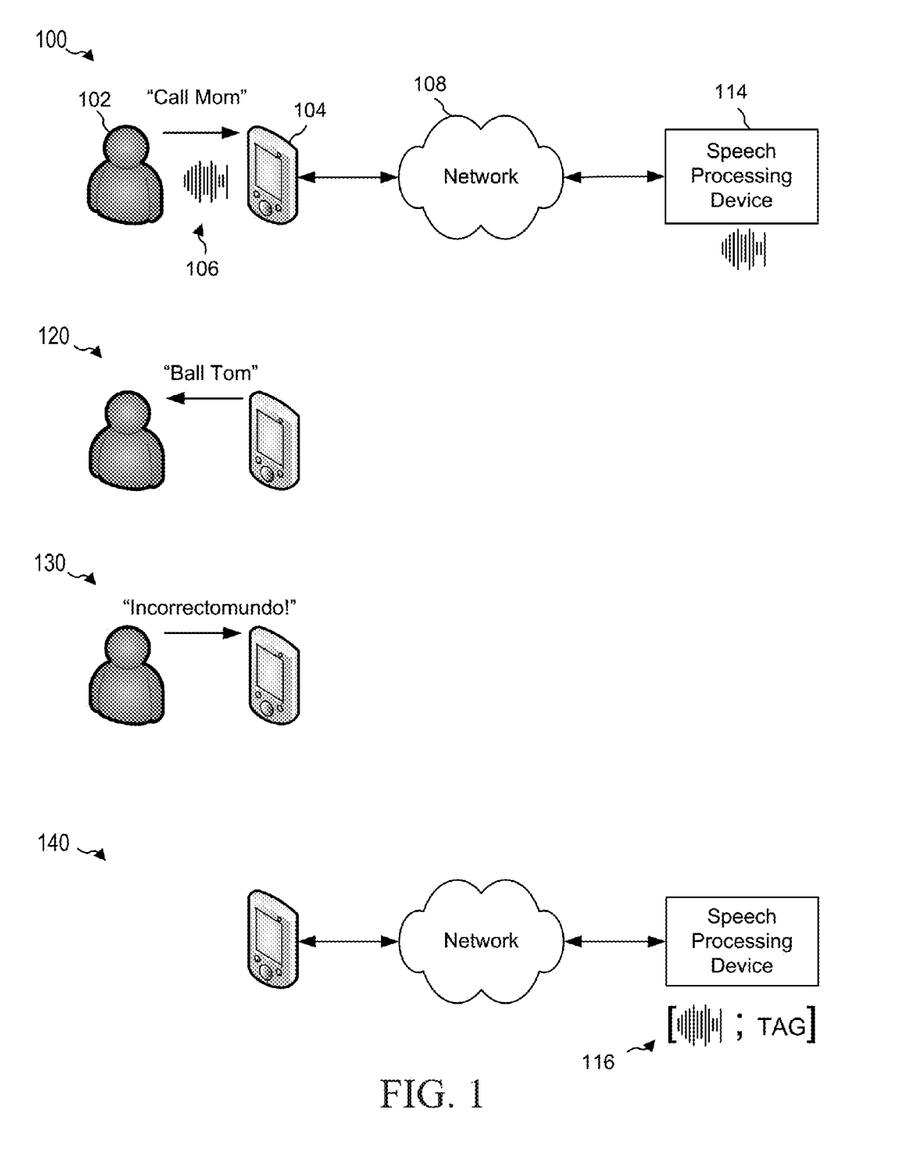
FIG. 1 illustrates detecting incorrectly processed speech processing results according to one aspect of the present disclosure.

FIG. 1 shows a speech processing system for detecting incorrect speech processing results according to one aspect of the present disclosure. At time 100 a user 102 inputs a spoken audio command to local device 104. The command includes the spoken audio 106 "call mom." The device 104 then sends a version of the spoken audio 106 over the network 108 to a back-end speech processing device 114, where the spoken audio 106 is stored and processed. Although the system illustrated in FIG. 1 is a distributed speech processing system, the teachings herein may apply to any combination of speech processing systems including distributed systems, localized systems, etc. The speech processing device 114 then processes the spoken audio and returns certain speech recognition results over the network 108 to the local device 104. The local device (or remote device) may also perform natural language processing on the ASR results to perform an action as desired by a user. In the example of FIG. 1, at time 120 the local device returns the result "ball tom" to the user. This result is incorrect.

To indicate to the device that the result is incorrect, at time 130 the user speaks a special audio trigger indicator that is configured to notify the device that previously delivered speech processing results are incorrect. The trigger indicator may be configured to be a word that is rarely spoken by the user and may be easily recognized by the device under a variety of acoustic conditions. As illustrated in FIG. 1, this trigger indicator is the word "incorrectomundo," however any number of words or phrases may be used as further detailed below.

At time 140, when the speech processing system recognizes the audio trigger indication (either through processing by the local device 104 or by the back-end device 114) a special tag (illustrated as "TAG" in FIG. 1) or other indicator is associated with the spoken audio 106, which was received prior to the trigger indication. In one aspect the tag may be a special code to be recognized by a back-end device. In another aspect, the tag may be the trigger indication itself. The associated tag and audio, shown as data element 116, are processed by the back-end device 114 or are sent to some other device associated with training and improving the speech processing system. The training device may then search its data stores for the special tag to quickly identify and prioritize incorrect speech processing results and their associated input/output for system correction and upgrading. In this manner a training system may avoid reviewing all speech processing results to identify incorrectly processed results on which to focus training results, thereby avoiding unnecessary transcription and processing of originally correctly processed speech results.

Figure 2:
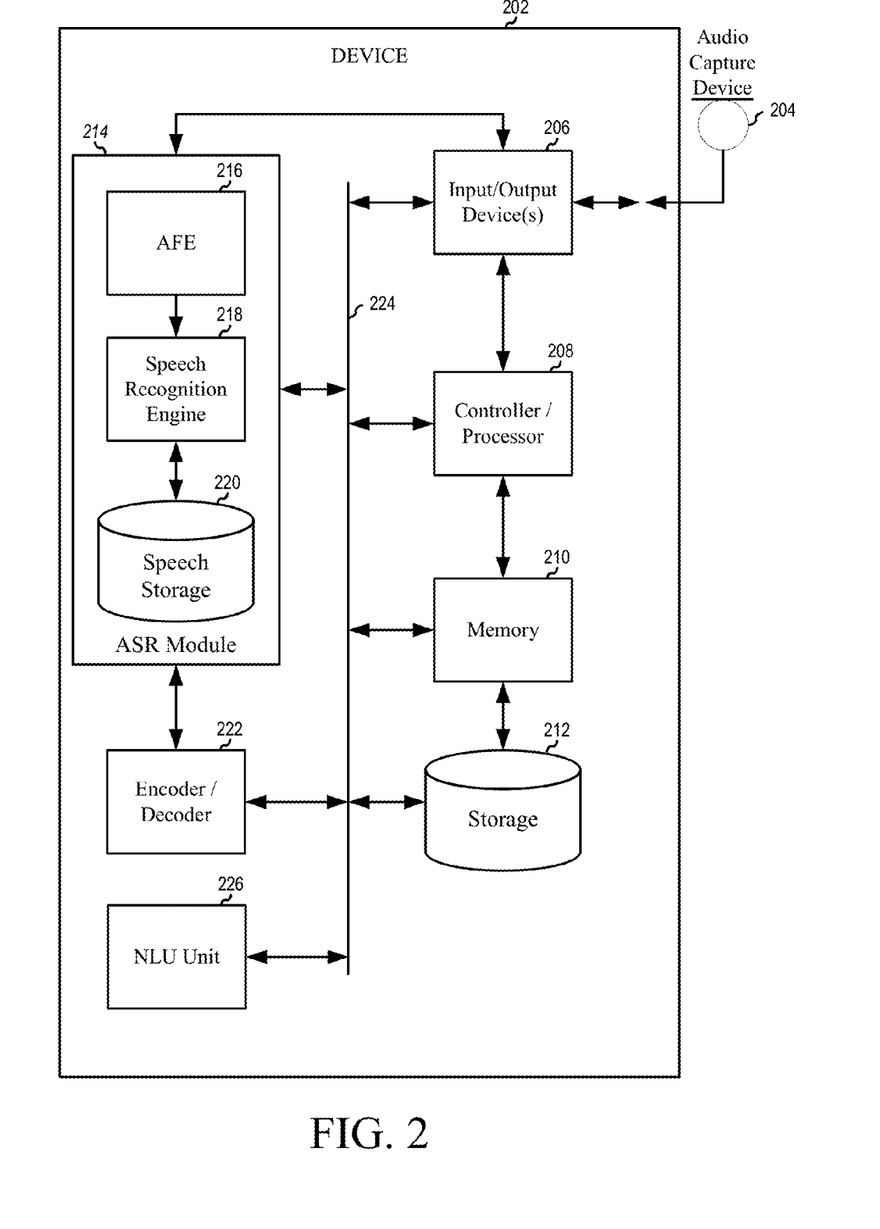
FIG. 2 is a block diagram conceptually illustrating a device for speech processing according to one aspect of the present disclosure.

FIG. 2 shows a speech processing device 202 for performing speech recognition. Aspects of the present disclosure include computer-readable and computer-executable instructions that may reside on the device 202. FIG. 2 illustrates a number of components that may be included in the device 202, however other non-illustrated components may also be included. Also, some of the illustrated components may not be present in every device capable of employing aspects of the present disclosure. Further, some components that are illustrated in the device 202 as a single component may also appear multiple times in a single device. For example, the device 202 may include multiple input/output devices 206 or multiple controllers/processors 208.

Multiple devices may be employed in a single speech processing system. In such a multi-device system, the devices may include different components for performing different aspects of the speech processing. The multiple devices may include overlapping components. The device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The device 202 may also be a component of other devices or systems that may provide speech processing functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the device 202 may include an audio capture device 204 for capturing spoken utterances for processing. The audio capture device 204 may include a microphone or other suitable component for capturing sound. The audio capture device 204 may be integrated into the device 202 or may be separate from the device 202. The device 202 may also include an address/data bus 224 for conveying data among components of the device 202. Each component within the device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208 and/or the NLU unit 226).

The device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The device 202 may also include a data storage component 212, for storing data and instructions. The data storage component 212 may include one or more storage types such as magnetic storage, optical storage, solid-state storage, etc. The device 202 may also be connected to removable or external memory and/or storage (such as a removable memory card, memory key drive, networked storage, etc.) through the input/output device 206. Computer instructions for processing by the controller/processor 208 for operating the device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the device 202 may connect to a network, such as the Internet or private network, which may include a distributed computing environment.

The device may also include an automatic speech recognition (ASR) module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 224, input/output device(s) 206, audio capture device 204, encoder/decoder 222, controller/processor 208, NLU unit 226 and/or other component of the device 202. Audio data sent to the ASR module 214 may come from the audio capture device 204 or may be received by the input/output device 206, such as audio data captured by a remote entity and sent to the device 202 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 204 and input/output device 206 may be configured to adjust the audio data based on traditional tradeoffs of quality versus data size or other considerations.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the device 202, for example. Similarly, the instructions for operating the AFE 216 and speech recognition engine 218 may be located within the ASR module 214, within the memory 210 and/or storage 212 of the device 202, or within an external device.

Figure 3:
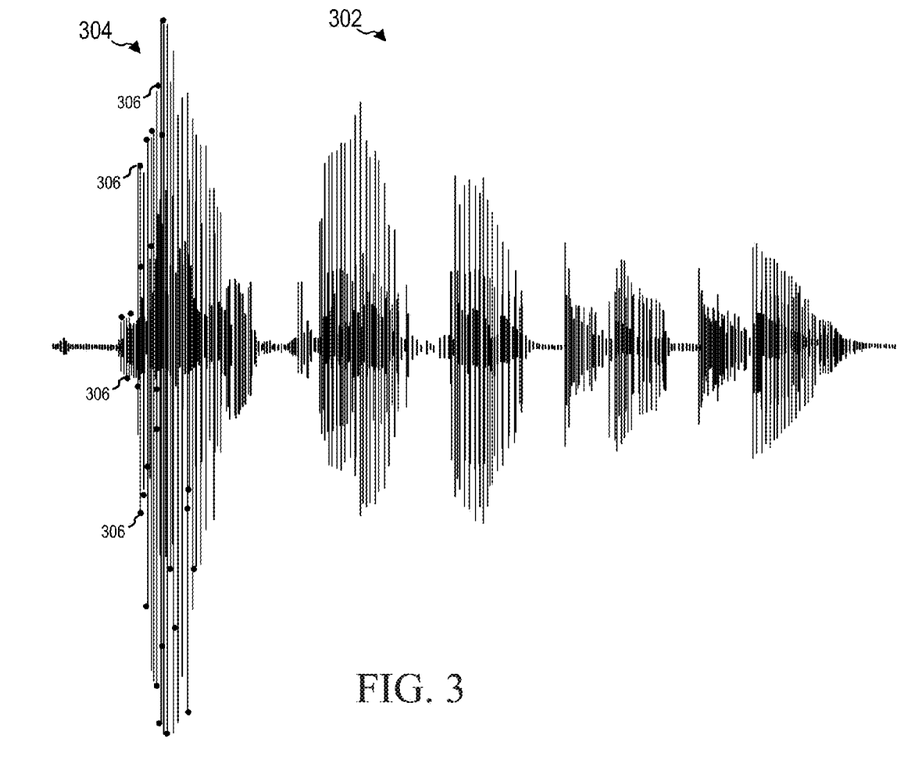
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be streamed or combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the device 202 through the input/output device(s) 206. Feature vectors may arrive at the device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train and improve the models used by the ASR module 214 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular subword units. Those subword units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM (automated teller machine), the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

A number of potential ASR results, called hypotheses, may be calculated. These multiple potential results may be formed into paths. Each path represents a progression of phonemes that potentially match the audio data represented by the feature vectors. One path may overlap with one or more other paths depending on the recognition scores calculated for each phoneme. Certain probabilities are associated with each transition from phoneme to phoneme. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 218 may also compute scores of branches of the paths based on language models or grammars. Language modeling involves determining scores for what words are likely to be used together to form coherent words and sentences. Application of a language model may improve the likelihood that the ASR module 214 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 220 and may be customized for particular applications.

Figure 4:
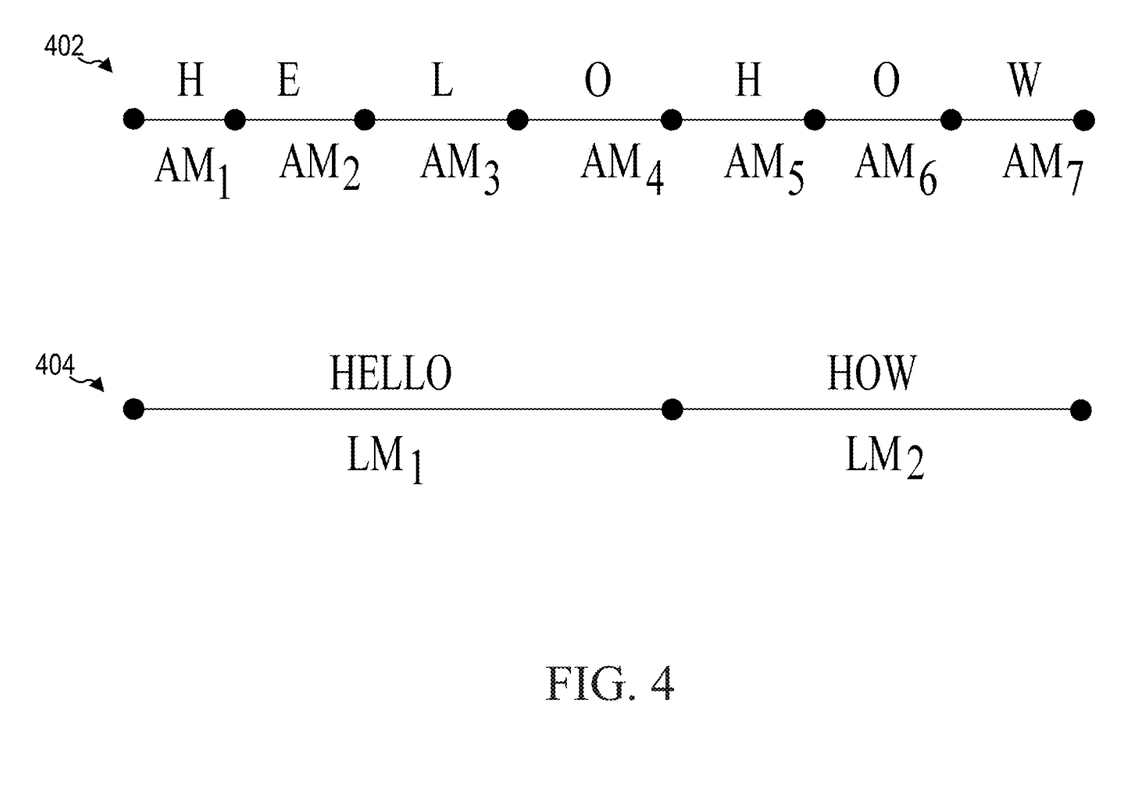
FIG. 4 illustrates phoneme processing and word processing according to one aspect of the present disclosure.

FIG. 4 illustrates the relationship between acoustic modeling and language modeling. As illustrated, each processed phoneme included in the path 402 is associated with an acoustic model score $AM_1$ through $AM_7$. The language model is then applied to associate each word in the path 404 with a language model score $LM_1$ or $LM_2$.

As part of the language modeling (or in other phases of the ASR processing) the speech recognition engine 218 may, to save computational resources, prune and discard low recognition score states or paths that have little likelihood of corresponding to the spoken utterance, either due to low recognition score pursuant to the language model, or for other reasons. Further, during the ASR processing the speech recognition engine 218 may iteratively perform additional processing passes on previously processed utterance portions. Later passes may incorporate results of earlier passes to refine and improve results.

Figure 5:
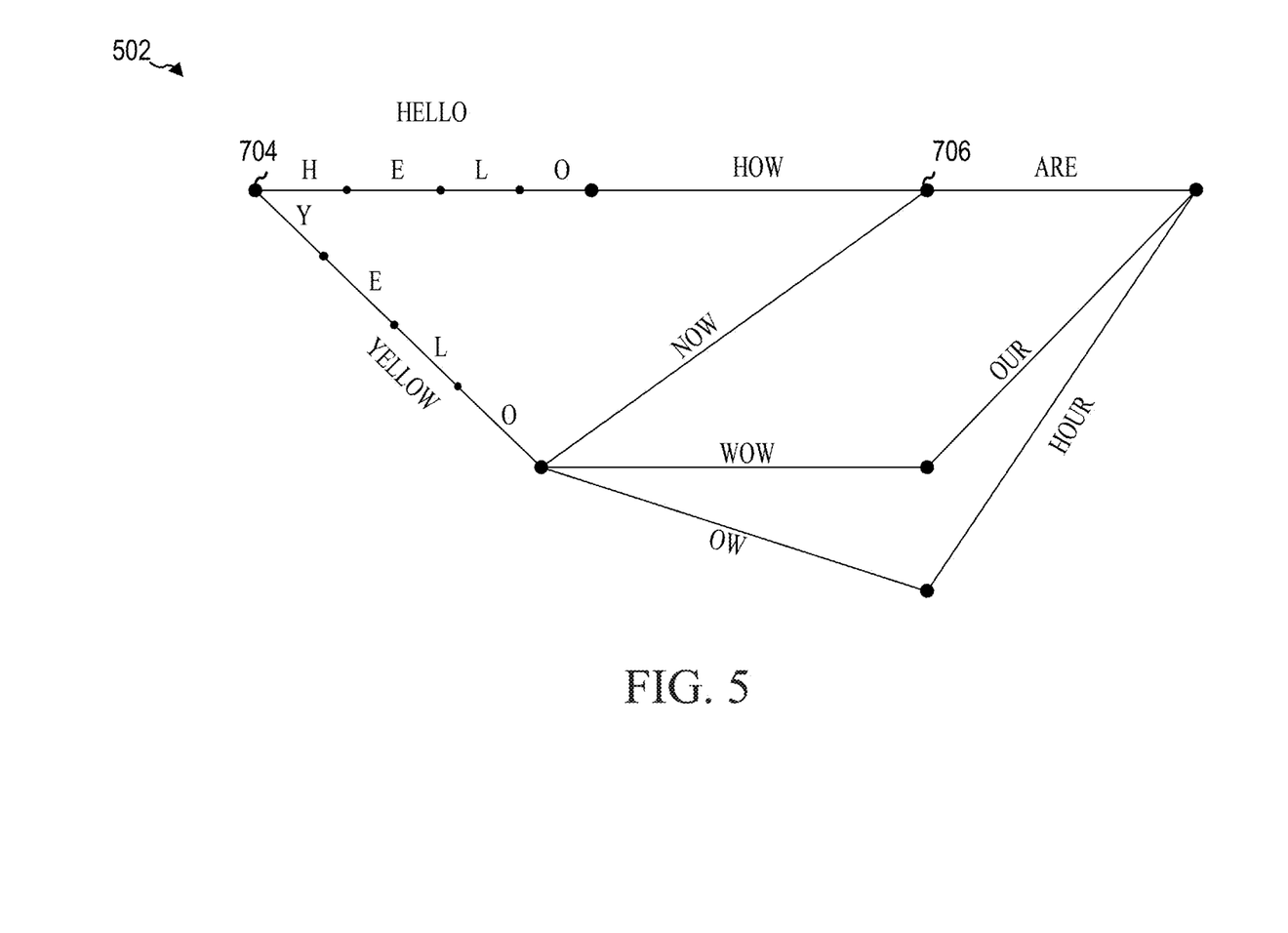
FIG. 5 illustrates a speech recognition lattice according to one aspect of the present disclosure.

The speech recognition engine 218 may combine potential paths into a lattice representing speech recognition results. A sample lattice is shown in FIG. 5. The lattice 502 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 504 and node 506 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 218 as the ASR result for the associated feature vectors.

Figure 6:
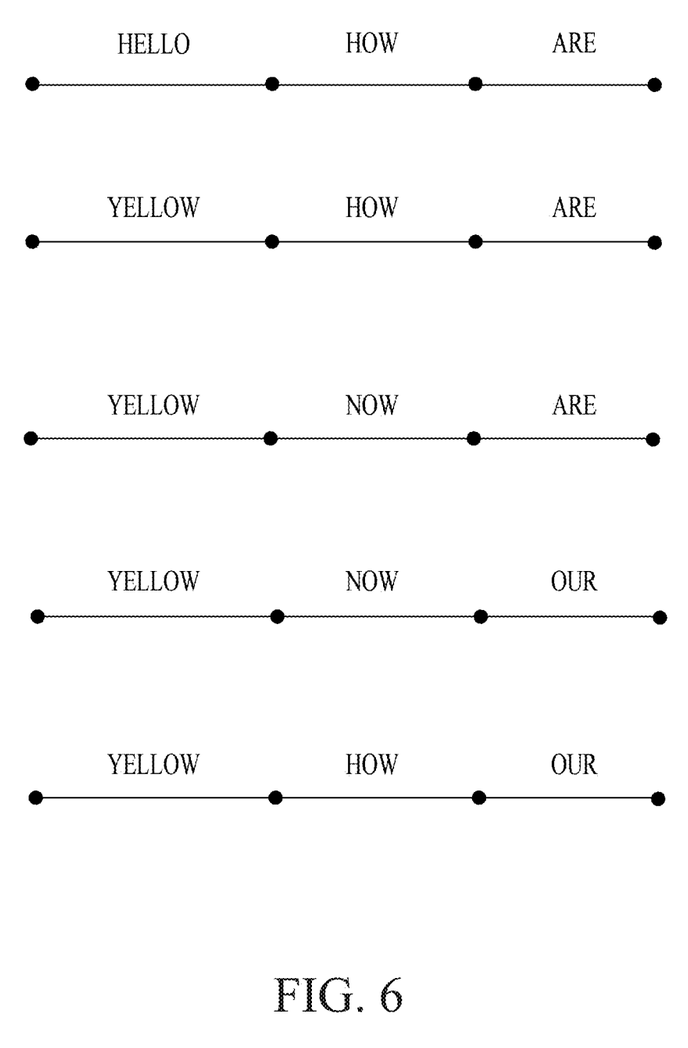
FIG. 6 illustrates an N-best list according to one aspect of the present disclosure.

The speech recognition engine 218 may return an N-best list of paths along with their respective recognition scores, corresponding to the top N paths as determined by the speech recognition engine 218. For example, FIG. 6 shows an N-best list returned for processing of a three-word path. An application (such as a program or component either internal or external to the device 202) that receives the N-best list may then perform further operations or analysis on the list given the list and the associated recognition scores. For example, the N-best list may be used in correcting errors and training various options and processing conditions of the ASR module 214. The speech processing engine 218 may compare the actual correct utterance with the best result and with other results on the N-best list to determine why incorrect recognitions received certain recognition scores. The speech processing engine 218 may correct its approach (and may update information in the speech storage 220) to reduce the recognition scores of incorrect approaches in future processing attempts.

Following ASR processing, the ASR results may be sent by the ASR module 214 to another component of the device 202, such as the controller/processor 208 for further processing (such as execution of a command included in the interpreted text) or to the input/output device 206 for sending to an external device.

For example, ASR results may be sent to a natural language understanding (NLU) unit 226 for further speech processing. The NLU may include a dedicated NLU engine, processor, memory and/or other components, or may use components otherwise available on the device 202. The NLU unit takes the textual output of ASR processing and attempts to make a semantic interpretation of the ASR result. That is, the NLU unit determines the meaning behind the text based on the individual words and then implements that meaning. The NLU processing is based on the models and programming available to the NLU unit. Such models may be grammar based, rule based, or constructed in a different manner. The NLU unit interprets the text string to derive an intent or a desired action from the user as well as the pertinent pieces of information in the text that let you complete that action. For example, if a spoken utterance is processed by an ASR module and outputs the text "call mom" the NLU unit will determine that the user intended to activate a telephone in his/her device and to initiate a call with a contact matching the description "mom." The NLU may be configured to annotate text as part of NLU processing. For example, for the text "call mom," "call" may be annotated as a command (to execute a phone call) and "mom" may be annotated as a target of the command (and the telephone number for "mom" in a contact list may be included in the annotation). To correctly perform NLU processing of speech input the NLU may be configured to communicate with a variety of other components/applications of a device.

In this manner the NLU may initiate instructions to other components/applications of a device in order to perform actions the NLU believes have been commanded by a user. NLU processing may be performed by a local device or by a remote device. If performed by a remote device, the remote device may then send instructions to a local device to perform operations based on the NLU results.

Figure 7:
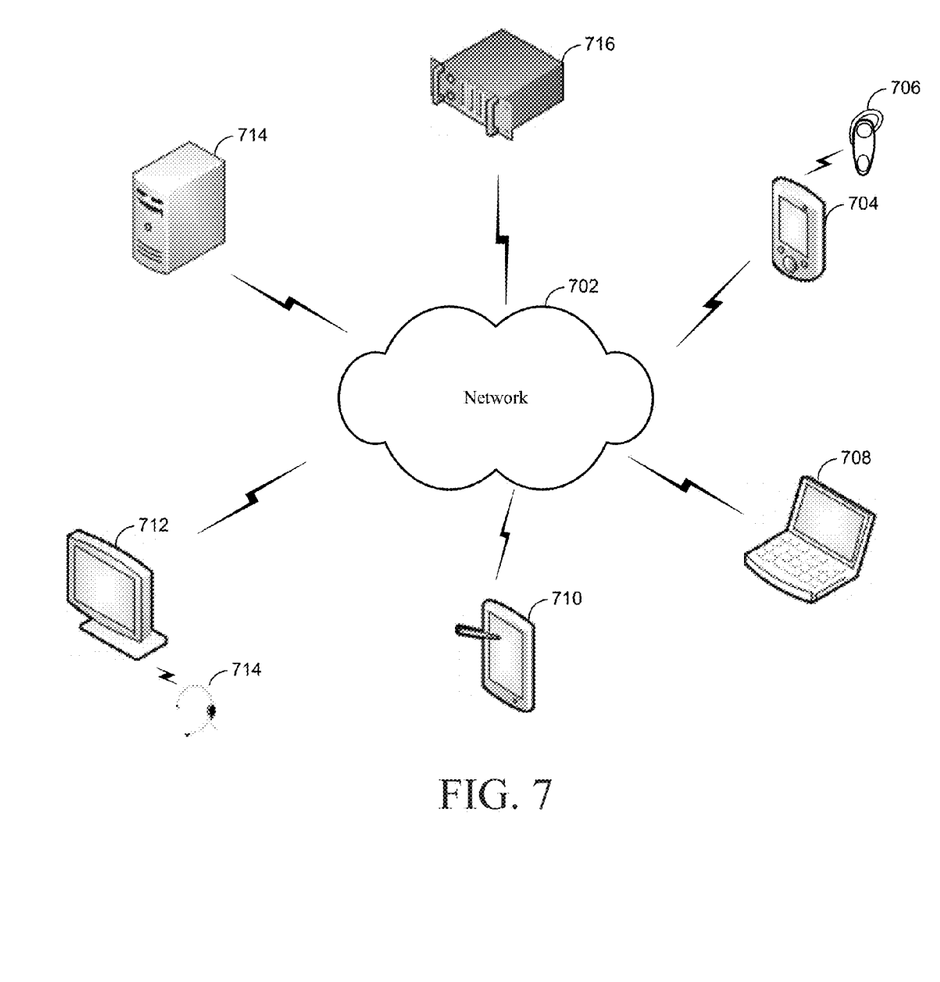
FIG. 7 illustrates a computer network for use with distributed speech processing according to one aspect of the present disclosure.

As shown in FIG. 7, multiple devices may be connected over a network 702. Network 702 may include a local or private network or may include a wide network such as the internet. Devices may be connected to the network 702 through either wired or wireless connections. For example, a wireless device 704 may be connected to the network 702 through a wireless service provider. Other devices, such as computer 712, may connect to the network 702 through a wired connection. Other devices, such as laptop 708 or tablet computer 710 may be capable of connection to the network 702 using various connection methods including through a wireless service provider, over a WiFi connection, or the like. Networked devices may input spoken audio through a number of audio input devices including through headsets 706 or 714. Audio input devices may be connected to networked devices either through a wired or wireless connection. Networked devices may also include embedded audio input devices, such as an internal microphone (not pictured) in laptop 708, wireless device 704 or table computer 710.

In certain speech processing system configurations, one device may capture an audio signal and other device(s) may perform the speech processing. For example, audio input to the headset 714 may be captured by computer 712 and sent over the network 702 to computer 714 or server 716 for processing. Or computer 712 may partially process the audio signal before sending it over the network 702. In another aspect, the speech capture, ASR, and NLU processing may all be performed on different devices. Because speech processing may involve significant computational resources, in terms of both storage and processing power, such split configurations may be employed where the device capturing the audio has lower processing capabilities than a remote device and higher quality results are desired. The audio capture may occur near a user and the captured audio signal sent to another device for processing.

To improve the quality of speech processing, a speech processing device may review results of previously performed speech processing to identify where correct and/or incorrect results were obtained and how to train the speech processing system and improve results to reduce the likelihood of future incorrect results. In a distributed speech processing environment, this may involve large amounts of data being sent from user facing devices, such as wireless device 704, to data processing devices, such as server 716. Data input from the wireless device 704 may assist the server 716, or other back-end speech processing device, with improving acoustic, language, NLU, or other models, as explained below. In particular, a back-end speech processing device may focus on speech processing events which were processed incorrectly, and determine how to adjust the models and general speech processing to avoid such incorrect processing in the future.

In large volume speech processing systems, however, a back-end speech processing device may receive large volumes of data from user facing devices for analysis and eventual correction. The data volume may be so large that it is impractical for the speech processing system to review all the data for purposes of improving speech processing. To isolate data that is particularly desired for training purposes a speech processing system may focus its training efforts on speech processing with lower confidence scores, meaning results which the speech processing system believes may not be correct. Such confidence scores, however, are not themselves always accurate, meaning that the speech processing system may dedicate training resources to reviewing speech processing results which were actually correct. This may take away from training resources that might be used on previous incorrect speech processing results, which may more efficiently be used to train the speech processing system.

To identify and locate within large data quantities speech processing results that are desired for training purposes (such as incorrect speech processing results) a user may be offered an audio trigger word, such as a verbal response, to indicate to a device when a speech processing result is incorrect. The term "trigger word" as used herein may also include a phrase, grunt, noise or combination of noises configured to perform the triggering activity as described herein. Based on this trigger word, a speech processing device may then flag or otherwise mark the previous speech processing result for further analysis by the speech processing system for training purposes. The speech processing system may be programmed to scan incoming speech processing data for the flag. The speech processing system may then prioritize analysis of flagged data over other data when performing training and/or system adjustment. For example, if a user provides a spoken command to a device and the device returns speech processing results that are incorrect (either as a result of incorrect audio input, incorrect ASR processing, incorrect NLU processing, or some combination thereof) the user may speak a trigger indication to the local device that the results are incorrect.

To improve performance, the trigger indication may be one that is robust, meaning one that is likely to be recognized by a speech processing device under a variety of conditions. To be robust for an ASR language model, the spoken indication may be a word or phrase that is not commonly received by the local speech processing device. Configuring the indication to be a less common input may make it more likely that a language model will recognize the user's input as the trigger indication of an incorrect speech processing result rather than simply a regular spoken input. For example, if the trigger indication is "no, that's not right", it may be more difficult for the language model to recognize that input string as a special instruction, as those words may be commonly input and processed by a speech processing device under non-trigger speaking conditions. If the trigger indication is something along the lines of "Rumpelstiltskin" (assuming that word is not commonly received by the speech processing device), the speech processing device may be more likely to recognize the input as the stand-alone phrase special trigger indication, thus more easily marking the previously processed speech processing results as incorrect, and flagging them for eventual processing during system training.

Even if the trigger indication is one that is infrequently spoken, however, if the sounds of the indication are not properly recognized by a speech processing device, the trigger indication may not perform as desired. Thus, to further improve performance, the trigger indication may be one that is also robust for an ASR acoustic model. That is, the sounds of the trigger indication may also be ones that are likely to be recognized under various audio conditions such as a busy street corner, a noisy bus, a quiet park, etc. For example, while a specific whistle or grunt by a user may be infrequently input into the device, such an audio indication may be difficult to process in a noisy environment and may not be desirably robust. A more acoustically robust trigger indication, such as one that involves easily recognizable (but infrequently spoken) vocalization, may be more desirable. To design and recognize a robust indication, the device may make use of techniques described in in co-pending application, U.S. patent application Ser. No. 13/670,316, filed on Nov. 6, 2012, in the names of Salvador, et al. entitled "Wake Word Evaluation," which is hereby incorporated by reference in its entirety. In a distributed speech processing system the trigger indication may be recognized by a back-end speech processing device or may be recognized by a local user facing device which performs some front-end ASR processing to identify special commands, such as the trigger indication.

In one aspect, the audible trigger indication may be combined with some form of non-audible indication, such as a user initiated physical interaction. For example, a user may be prompted to further indicate undesired speech processing results through some interaction with a device such as pressing an indicated button, shaking the device, squeezing the device, etc. Such a further indication combined with the audible trigger indication may improve the speech processing device's ability to recognize when speech processing has been incorrectly performed.

In one aspect, a speech processing device may be configured with a default trigger indication that may be used by multiple users. In another aspect, the default trigger may be customized for a particular user or group of users to improve robustness, such as, for example, in the situation where a default trigger indication may be a term that is otherwise frequently used by the user(s) in question. For example, a speech processing device may allow a user to configure a trigger indication that is desirable to the user and meets certain system conditions, such as robustness measures described above. A user may, for example, choose a word in a different language as a way of isolating the trigger indication from otherwise normal speech.

To improve user recognition and adoption of the trigger indication (which may in turn improve overall speech processing system quality by making training more efficient as described above), a humorous or whimsical trigger indication may be chosen. Further, the speech processing device upon receipt of the trigger indication may also offer feedback to the user to indicate that the trigger indication has been received. Such feedback may include an audible acknowledgment, a recorded apology message, or other feedback. Other user-based incentives may be employed to encourage use of the trigger indication, such as offering a user some remuneration for providing a certain number of trigger indications, offers for complementary service features, etc.

As an alternative, or in addition to, a single trigger indication, a speech processing device may be configured with natural language understanding capabilities which may recognize when speech processing results are incorrect. For example, if a user responds to speech processing by saying "that's not what I said. What I said was . . . " (or similar statement), or otherwise expresses dissatisfaction or frustration with the outcome of speech processing, the ASR system may flag the incorrect speech processing results for further processing for system improvement. Further, a speech processing device may be configured to identify when similar or identical phrases are repeatedly input by a user, indicating to the speech processing device that there may be difficulty in processing the particular phrase. Such difficult to process phrases may be flagged by the speech processing system for further review for training purposes, with the goal of improving system performance so that the repeatedly input phrase may be accurately processed in future attempts.

In another aspect, the indication/flag for priority processing during training may be applied without user input. For example, the speech processing device may insert the indication on its own when it encounters a word that is not recognized by the system, when the device encounters a word for which it lacks a good pronunciation model, etc. In this manner the speech processing device may proactively flag difficult or rare words or phrases, the identification of which may be used to improve overall speech processing system performance through focused training by a back-end process.

In another aspect, if a particular user repeatedly indicates that the device is returning incorrect speech processing results, then the system may flag the spoken input for that particular user for further processing during system training. In this manner the system may prioritize improving performance for troubled users, which may in turn improve performance for other similarly situated users, such as users with thick accents, similar voices, etc.

When a spoken speech processing input is flagged or indicated for further processing, the audio file of the spoken input in question may be tagged and sent to a remote speech processing device, such as server 716, along with the ASR hypothesis corresponding to the spoken input, for training and system improvement. Additional data, such as a lattice or N-best list used by the system to originally process the spoken input in question, may also be captured and analyzed to determine why the speech processing was incorrect. For a distributed speech processing system, when the system encounters a trigger indication or corresponding flag, the system may be configured to go back in time for a specific window to identify potentially incorrect speech processing input. For example, while performing speech processing the system may recognize the trigger indication and isolate a previous 30 seconds (or some other time period) of spoken input and corresponding speech processing for further review by a training process. The time period may be isolated by inserting specially recognizable time stamps into the data for identification by the speech processing system.

In one aspect, speech processing results isolated for further review by a training process may be isolated and separately stored by the speech processing system. For example, for a distributed speech processing system that regularly receiving large amounts of data for training purposes, specially tagged data may be stored in a different location so that it may be considered separately from other training data.

Spoken input that has been specially tagged according to the aspects described above may be transcribed and reviewed by the speech processing system or corresponding technicians to modify the acoustic, language, or other models employed by the speech processing system to train the system and improve system performance. For example, the spoken input may have been improperly processed due to inclusion of a new word that may have come into the lexicon that previously was unrecognized by the system. Or a new person's name, which otherwise the system had difficulty processing, has become sufficiently prominent (such as a new performer or public figure) that the name may be specifically added to the speech processing system. In other aspects the system may identify recognition difficulties that may result in adjustments to the speech processing models. In another example, the system may identify a specific trait of one or more users (i.e., accent, rate of speech, etc.) that results in adjustments to speech processing models for those specific users. In still another example, the system may recognize that speech processing results are more inaccurate for specific devices and adjust speech processing models for those devices. In another example, the speech processing system may consider location data (such as GPS data) and/or time stamp data that correspond to incorrectly processed speech processing results and may identify which specific geographic locations/times (such as certain city blocks during certain times of day) result in higher instances of incorrect speech processing results and may adjust speech processing for those locations/times accordingly.

In another aspect, a dissatisfactory speech recognition result experienced by a user (and indicated through the spoken trigger indication) may not be the result of faulty speech-to-text processing, but rather the result of incorrect processing by a later portion of ASR processing or by a later application. For example, a user may speak a command to a device. An ASR module may correctly process the words spoken by the user, but a natural language understanding engine, such as may be found in NLU unit 226, may incorrectly translate those words into determining the command desired by the user. Thus the user may experience and report an undesired speech recognition result, even if the speech-to-text processing was correct. The speech processing system may be configured to recognize when words are being correctly recognized by the speech-to-text processing (i.e. acoustic models, language models, etc.) but other aspects of the system, such as the natural language understanding, or later applications, may be failing to properly execute user commends, resulting in a dissatisfactory user experience.

As a specific example of the above, a user may be instructing a device to play music from a certain artist. The ASR processing may correctly process the words being spoken by the user (for example, "Play The Who") but the natural language processing to execute the user command may be incorrectly processing the words due to some confusion with the artist's name or otherwise being unable to perform the precise task desired by the user. In this situation natural language understanding models (such as a named entity recognition model) may be updated to properly handle such instructions in the future. In another aspect the speech processing system may notify certain post-speech processing applications that the user was dissatisfied with the result of the application's processing of the speech processing results and that the application should update its own performance to improve the user's experience.

Figure 8:
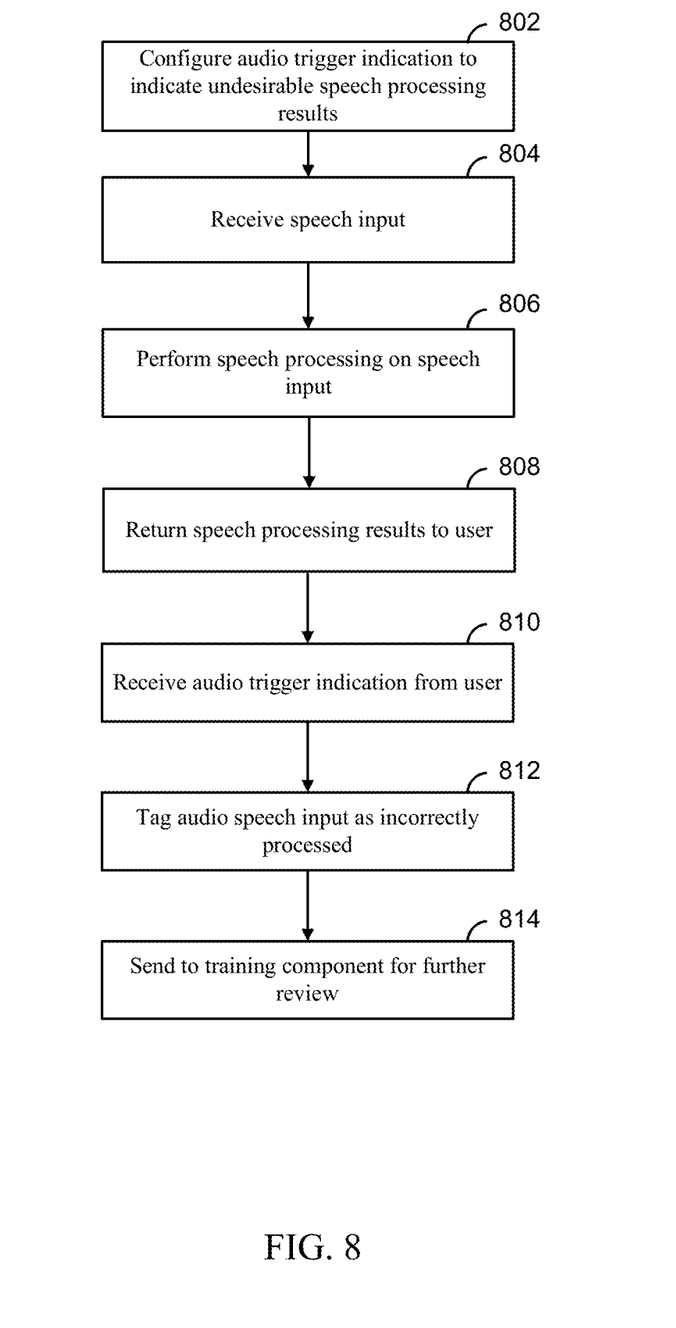
FIG. 8 illustrates detecting incorrectly processed speech processing results according to one aspect of the present disclosure.

In one aspect of the present disclosure, a speech processing system may identify incorrect speech processing results for further processing as shown in FIG. 8. A speech processing device may configure an audio trigger indication to indicate incorrect speech processing results (which may include an action being performed by a downstream application), as shown in block 802. A speech processing device may then receive speech input from a user, as shown in block 804. The speech processing device may then perform speech processing on the received speech input, as shown in block 806. The speech processing device may then return the speech processing results to the user, as shown in block 808. If the results are incorrect, the user may speak the audio trigger indication to the device, as shown in block 810. The user may also indicate dissatisfactory results that may be processed by an NLU unit, such as saying "no, that's not right." A speech processing device, such as a remote device, may then tag the incorrectly processed speech with a code so the speech may be easily identifiable by a training component of a speech processing system, as shown in block 812. The tagged incorrectly processed speech may then be sent to the training component, or some other portion of the speech processing system, for later review and training, as shown in block 814.

In one aspect of the present disclosure techniques for the trigger indication for incorrect speech processing may also be applied to text-based input systems and/or multi-modal systems involving both audio and speech inputs. In such systems a user may input audio and/or text into a device for processing. As a result of the combined processing, the device may return to the user an incorrect result. The user may then indicate the incorrect result to the system by either speaking the trigger indication into the device and/or inputting the trigger indication into the device through a textual input, such as typing, using a stylus, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the speech recognition techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method performed by a speech recognition processing component, the method comprising:
   receiving first audio data;
   determining, using the first audio data, speech processing results;
   determining second data indicating that the speech processing results include a first incorrect portion;
   determining third audio data as corresponding to the first incorrect portion, wherein the third audio data includes at least a portion of the first audio data;
   after determining third audio data corresponding to the first incorrect position, generating an indicator associated with the third audio data; and
   sending the third audio data, the indicator and the first incorrect portion to a speech recognition training component.

2. The method of claim 1, wherein the second data comprises audio data and the method further comprises:
   determining, using the second data, second speech processing results;
   determining, using the second speech processing results, natural language processing results; and determining, using the natural language processing results that the speech processing results include the first incorrect portion.

3. The method of claim 2, further comprising determining the second data comprises a trigger phrase.

4. The method of claim 1, further comprising:
receiving the first audio data from a first device; and
receiving the second data from the first device.

5. The method of claim 1, further comprising:
receiving the first audio data from a first device; and
receiving the second data from a second device.

6. The method of claim 1, further comprising determining the second data using the speech processing results.

7. The method of claim 1, further comprising:
determining a second indicator including an identifier corresponding to a user associated with the first audio data; and
sending the second indicator to the speech recognition training component for further training corresponding to the user.

8. A computing system, comprising:
at least one processor;
memory including instructions operable to be executed by the at least one processor to perform a set of actions, configuring the computing system to:
receive first audio data;
determine, using the first audio data, speech processing results;
determine second data indicating that the speech processing results include a first incorrect portion;
determine third audio data as corresponding to the first incorrect portion, wherein the third audio data includes at least a portion of the first audio data;
after determining third audio data corresponding to the first incorrect position, generate an indicator associated with the third audio data; and
send the third audio data, the indicator and the first incorrect portion to a speech recognition training component.

9. The computing system of claim 8, wherein the second data comprises audio data and the computing system is further configured to:
determine, using the second data, second speech processing results;
determine, using the second speech processing results, natural language processing results; and
determine, using the natural language processing results that the speech processing results include the first incorrect portion.

10. The computing system of claim 9, wherein the computing system is further configured to determine the second data comprises a trigger phrase.

11. The computing system of claim 9, wherein the computing system is further configured to determine the second data using the speech processing results.

12. The computing system of claim 9, wherein the computing system is further configured to:
determine a second indicator including an identifier corresponding to a user associated with the first audio data; and
send the second indicator to the speech recognition training component for further training corresponding to the user.

13. The computing system of claim 8, wherein the computing system is further configured to:
receive the first audio data from a first device; and
receive the second data from the first device.

14. The computing system of claim 8, wherein the computing system is further configured to:
receive the first audio data from a first device; and
receive the second data from a second device.

15. A non-transitory computer-readable storage medium storing non-transitory processor-executable instructions for controlling a computing system, comprising:
program code to receive first audio data;
program code to determine, using the first audio data, speech processing results;
program code to determine second data indicating that the speech processing results include a first incorrect portion;
program code to determine third audio data as corresponding to the first incorrect portion, wherein the third audio data includes at least a portion of the first audio data;
program code to, after determining third audio data corresponding to the first incorrect position, generate an indicator associated with the third audio data; and
program code to send the third audio data, the indicator and the first incorrect portion to a speech recognition training component.

16. The non-transitory computer-readable storage medium of claim 15, wherein the second data comprises audio data and the non-transitory processor-executable instructions further comprise:
program code to determine, using the second data, second speech processing results;
program code to determine, using the second speech processing results, natural language processing results; and
program code to determine, using the natural language processing results that the speech processing results include the first incorrect portion.

17. The non-transitory computer-readable storage medium of claim 16, wherein the non-transitory processor-executable instructions further comprise program code to determine the second data comprises a trigger phrase.

18. The non-transitory computer-readable storage medium of claim 15, wherein the non-transitory processor-executable instructions further comprise:
program code to receive the first audio data from a first device; and
program code to receive the second data from the first device.

19. The non-transitory computer-readable storage medium of claim 15, wherein the non-transitory processor-executable instructions further comprise:
program code to receive the first audio data from a first device; and
program code to receive the second data from a second device.

20. The non-transitory computer-readable storage medium of claim 15, wherein the non-transitory processor-executable instructions further comprise program code to determine the second data using the speech processing results.

21. The non-transitory computer-readable storage medium of claim 15, wherein the non-transitory processor-executable instructions further comprise:
program code to determine a second indicator including an identifier corresponding to a user associated with the first audio data; and program code to send the second indicator to the speech recognition training component for further training corresponding to the user.

\* \* \* \* \*